United States Patent [19]
Miyao et al.

[11] 3,943,715
[45] Mar. 16, 1976

[54] SERVO MECHANISM

[75] Inventors: Takayuki Miyao; Hiroaki Maeda, both of Toyota; Masanori Sato, Nagoya, all of Japan

[73] Assignee: Aisin Seiki Kabushiki Kaisha, Aichi, Japan

[22] Filed: July 26, 1973

[21] Appl. No.: 382,911

[30] Foreign Application Priority Data
July 28, 1972   Japan............................ 47-076203

[52] U.S. Cl. ................. 60/431; 60/447; 60/449; 74/687; 74/857; 91/416; 91/417 R; 91/454; 91/457; 91/461
[51] Int. Cl.² ............................................ F02B 41/00
[58] Field of Search ............ 60/431, 433, 444, 447, 60/449; 91/454, 461, 304, 417 R, 416, 235, 321, 457; 74/687, 857; 137/596.15, 596.17

[56] References Cited
UNITED STATES PATENTS

| | | | |
|---|---|---|---|
| 2,974,639 | 3/1961 | O'Connor et al. .............. | 91/461 X |
| 3,080,887 | 3/1963 | Brandenberg.................... | 91/454 X |
| 3,139,723 | 7/1964 | Holowell ........................ | 60/433 |
| 3,300,000 | 1/1967 | Stoyke ............................ | 74/857 |
| 3,583,154 | 6/1971 | Utter.............................. | 60/431 |
| 3,665,788 | 5/1972 | Nyman............................ | 74/687 |
| 3,679,327 | 7/1972 | Riedhammer et al. ........... | 417/222 |
| 3,763,744 | 10/1973 | Fournell et al................. | 91/417 R |
| R26,523 | 2/1969 | Tennis ............................ | 91/454 |

OTHER PUBLICATIONS
IBM Technical Disclosure Bulletin, Vol. 10, No. 5, Oct. 1967, pp. 568–569.

*Primary Examiner*—C. J. Husar
*Assistant Examiner*—Edward Look
*Attorney, Agent, or Firm*—Oblon, Fisher, Spivak, McClelland & Maier

[57] ABSTRACT

A servo mechanism for a prime mover interconnected to a hydrostatic transmission includes a source of pressurized fluid, a fluid reservoir, an actuator having a piston operatively connected to the hydrostatic transmission and being provided with large and small hydraulic receiving areas which are exposed to first and second hydraulic chambers, respectively within the actuator housing, a first passage for connecting the pressurized fluid source to the second chamber, a second passage for connecting the pressurized fluid source to the first chamber, a third passage for connecting the first chamber to the reservoir, and a pair of spool valve means disposed, respectively, within the second and third passages and responsive to a signal indicative of the power required of the prime mover and an actual speed or feedback signal of the prime mover.

8 Claims, 3 Drawing Figures

SERVO MECHANISM

BACKGROUND OF THE INVENTION

The present invention relates generally to servo mechanisms, and more particularly to a servo mechanism for controlling a means having a controllable member in response to a difference, or an error signal, between a signal indicating the power required of the means and an actual speed or feedback signal thereof.

Conventionally, servo mechanisms comprise only one spool valve means and an actuator having a piston which is operatively connected to a means having a controllable member. The piston is slidably disposed within a housing of the actuator in order to thereby define first and second chambers within the housing. Each chamber is hydraulically connected through the spool valve means to a source of pressurized fluid and a reservoir. The spool valve means thus arranged is associated with an input signal of the required power and an actual or feedback signal of said means having the controllable member. Thus the spool valve means has three positions, namely, a first position wherein each chamber is interrupted from the pressurized fluid source and the reservoir, a second position wherein the first chamber is hydraulically connected to the pressurized fluid source while the second chamber is hydraulically connected to the reservoir, and a third position wherein the first and second chamber are hydraulically connected to the reservoir and the pressurized fluid source, respectively. Thus the piston will be stopped or moved in response to the position of the spool valve means. However, this requires four valving portions of the spool valve means and the relative position between these four valving portions must be formed with high accuracy which of course results in comparatively high manufacturing costs.

In order to obviate the drawbacks mentioned above, further conventional servo mechanisms have been proposed wherein a piston has large and small hydraulic pressure receiving areas. The small receiving area is adapted to be exposed to the first chamber which is always connected to a source of hydraulic fluid, and the large receiving area is adapted to be exposed to the second chamber which is connected through a spool valve means to the fluid source and a reservoir. However, such servo mechanisms still require two valving portions of the spool valve means, and thus such servo mechanisms also require high accuracy in construction and will also be comparatively high in cost.

Another conventional servo mechanism comprises a piston having small and large hydraulic pressure receiving areas which are exposed to a first and a second chamber, respectively. The first chamber is always connected to a source of hydraulic fluid while the second chamber is always connected to the fluid source through means of an orifice and is further connected to a reservoir through a spool or poppet valve means. Due to the orifice interposed between the fluid source and the second chamber, however, the speed by which the hydraulic pressure within the second chamber increases will be delayed, so that movement of the piston will also be delayed.

SUMMARY OF THE INVENTION

Accordingly, it is an object of the present invention to provide an improved servo mechanism for obviating the above-mentioned drawbacks.

Another object of the present invention is to provide an improved servo mechanism wherein an actuator for a means having a controllable member includes a piston which is connected to the controllable member and which is controlled and moved in association with movements of a pair of spool valve means responsive to a differential signal between a signal required of the means having the controllable member and an actual speed or feedback signal of the means having the controllable member.

Still another object of the present invention is to provide an improved servo mechanism wherein the pair of spool valve means for controlling the actuator are urged in one direction by means of a cam member which responds mechanically to the required signal, and are urged in the other direction in response to the actual speed or feedback signal.

Yet another object of the present invention is to provide an improved servo mechanism wherein a hydraulic modulator valve delivers an output hydraulic pressure in response to the required signal, and the pair of spool valve means for controlling the actuator are urged in one direction in response to the output hydraulic pressure and are urged in the other direction in response to the actual speed or feedback signal.

It is a further object of the present invention to provide an improved servo mechanism wherein means for preventing the overshoot movements of the pair of spool valve means is provided.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures, and wherein.

DETAILED DESCRIPTION OF THE PREFERRED EMBODIMENTS

Figure 1:
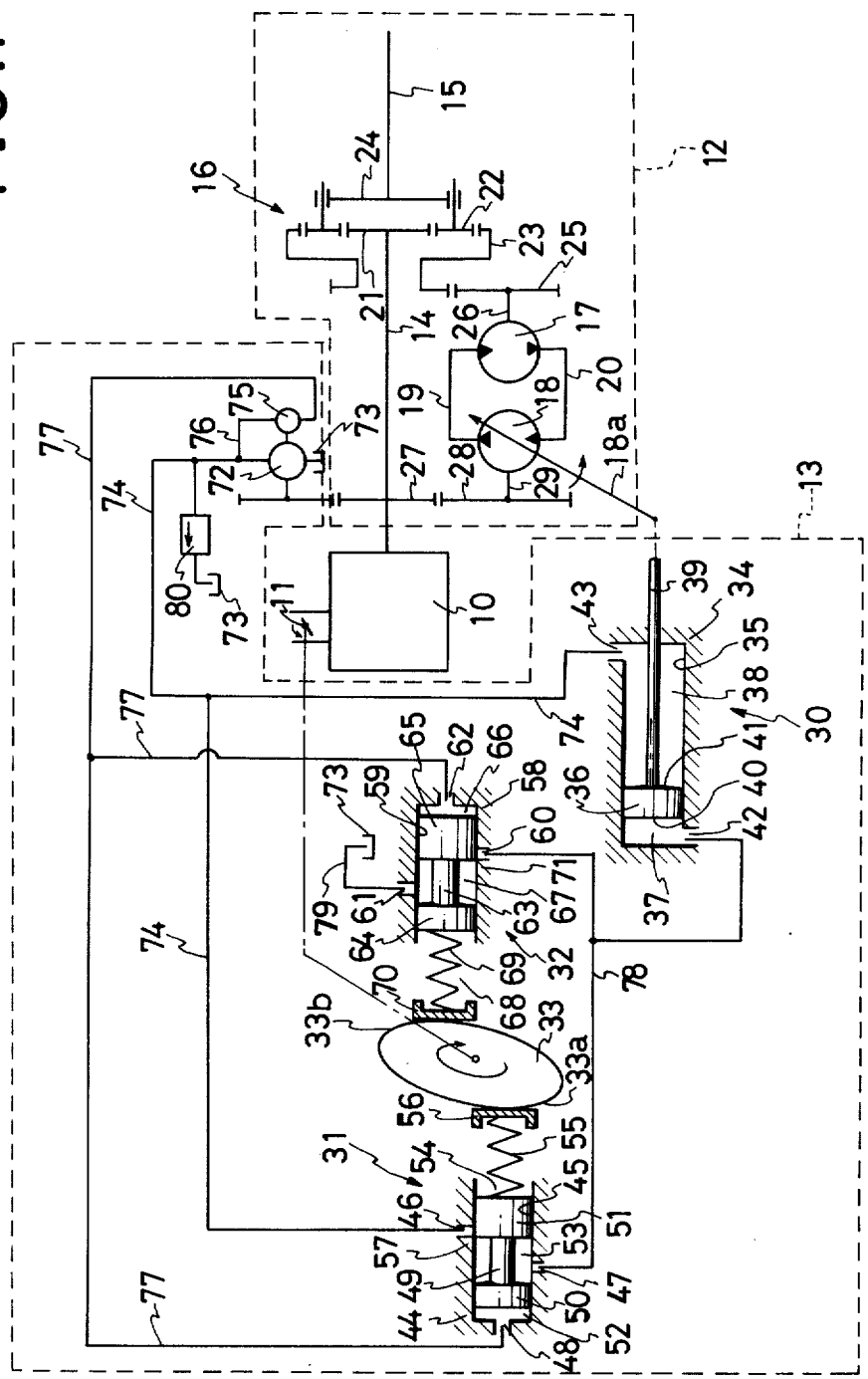
FIG. 1 is a schematic view, with some component parts being shown in cross-section, of one embodiment of the servo mechanism constructed according to the present invention.

Referring now to the drawings, it is initially noted that the preferred embodiments of the present invention are disclosed wherein the servo mechanisms constructed according to the present invention are particularly applicable to hydrostatic transmissions for vehicles, and wherein, as particularly shown in FIG. 1, a prime mover 10, such as for example, an internal combustion gasoline engine, is controlled by means of a conventional throttle valve 11 which supplies the motive fluid to the prime mover 10 for a particular power required by the prime mover. The prime mover 10 is operatively connected to a hydrostatic transmission 12 of the conventional output split-type, and a servo mechanism 13, constructed according to the present invention is associated therewith.

The hydrostatic transmission 12 comprises an input rotary shaft 14 connected to the prime mover 10, an output rotary shaft 15, a differential gear mechanism, generally indicated by the reference character 16, interposed between the shafts 14 and 15, and hydrostatic pump-motors 17 and 18 hydraulically interconnected with each other through means of a pair of hydraulic conduits 19 and 20. The differential gear mechanism 16 includes a sun gear 21 secured to the input shaft 14, planet gears 22 engaged with the sun gear 21, a ring gear 23 engaged with the planet gears 22, and a carrier 24, secured to the output shaft 15, for rotatably carrying the planet gears 22. The ring gear 23 is mechanically connected to a rotary shaft 26 associated with the hydrostatic pump-motor 17 through means of a gear 25, and another gear 27, secured to the input shaft 14, is similarly mechanically connected with a rotary shaft 29 associated with the hydrostatic pump-motor 18 through means of a gear 28.

The hydrostatic transmission 12 having such structure can of course be actuated as an output split-type hydrostatic transmission in a conventional manner, whereby, when the ratio of the displacement of the hydrostatic pump-motor 18 to the displacement of the hydrostatic pump-motor 17 is altered by means of the displacement of a swash plate or controllable member 18a of the hydrostatic pump-motor 18, the ratio of the rotational speed of the output shaft 15 to the rotational speed of the input shaft 14, that is, the speed ratio, is altered smoothly and continuously, and such speed ratio will increase as the controllable member 18a is displaced in the direction of the arrow.

The servo mechanism 13 serves to control the RPM of the prime mover 10 so as to be proportional to the throttle opening of the throttle valve 11 whereby the rotational operation of the prime motor 10 is properly maintained and timed in a predetermined manner. The servo mechanism 13 includes an actuator, generally indicated by the reference character 30, a pair of spool valve means, generally indicated by the reference characters 31 and 32, and a cam member 33 interposed between the spool valve means 31 and 32. The actuator 30 comprises a housing 34 having a cylinder bore 35 provided therein and a piston 36 slidably disposed within the cylinder 35 so as to thereby define first and second hydraulic chambers 37 and 38 therein. Piston 36 has a rod 39 associated therewith which extends through housing 34 and is operatively connected to the controllable member 18a of the hydrostatic pump motor 18. Consequently, piston 36 is provided with a large hydraulic pressure receiving surface 40 associated with the first chamber 37 and a small hydraulic pressure receiving surface 41 associated with the second chamber 38, housing 34 being also provided with radial ports 42 and 43 which are in communication with the first and second chambers 37 and 38, respectively.

The first spool valve means 31 includes a housing 44 which has a cylinder bore 45 and three ports 46, 47 and 48 associated therewith, a spool valve 49 having first and second lands 50 and 51 being slidably disposed within cylinder 45 in order to thereby define three chambers 52, 53 and 54 therewithin. The first chamber 52 is adapted to receive a governor pressure via the port 48, as will be more apparent hereinafter, whereby spool valve 49 will be urged toward the right as seen in FIG. 1, and a compression coil spring 55, accommodated within the third chamber 54, engages the spool valve 49 at one end thereof, and also engages a cam surface 33a of the cam 33 through means of a shoe 56 at the other end thereof. Cam 33 is operatively and mechanically connected to the throttle valve 11, and is thus rotated in the direction of the arrow as the throttle opening of the throttle valve 11 is increased, and therefore, spool valve 49 will be urged toward the left against the hydraulic pressure within the chamber 52 as the throttle opening valve 11 is increased. The two ports 46 and 47 are axially spaced and hydraulic communication therebetween may be interrupted when the land 51 of the spool valve 49 overlaps wall portion 57 of the housing 44, and may similarly be established through means of chamber 53 when the land 51 of the spool valve 49 does not overlap wall portion 57, port 47 of course always being in communication with chamber 53.

The construction of the second spool valve means 32 is substantially the same as that of the first spool valve means 31, and includes a spool valve 63, having first and second lands 64 and 65, slidably disposed within a cylindrical bore 59 of a housing 58 which is, in turn, formed with three ports 60, 61 and 62. Defined within the housing 58 by means of the spool valve 63 are first, second and third chambers 66, 67 and 68, and the spool valve 63 is urged, by means of the governor pressure within the first chamber 66, to the left, whereupon land 65 of the spool valve 63 may overlap wall portion 71 of the housing 58 thereby preventing communication between ports 60 and 61. The spool valve 63 is also urged, by means of a compression coil spring 69, toward the right whereupon hydraulic communication between the ports 60 and 61 may be established. The spring 69 engages, at one end thereof, a cam surface 33b of the cam 33 through means of a shoe 70, and engages land 64 of spool valve 63 at the other end thereof.

As will be apparent, the first and second spool valve means 31 and 32 are arranged symmetrically with respect to the cam member 33 and are adapted to operate symmetrically thereby. Within the preferred embodiment, for example, when the prime mover 10 is operated at a predetermined RPM proportional to the throttle opening of the throttle valve 11, both spool valve means 31 and 32 are adapted and arranged to be disposed at respective positions wherein hydraulic communication between the ports 46 and 47 is interrupted due to the overlapping condition between the wall portion 57 and the land 51, and hydraulic communication between the ports 60 and 61 is similarly interrupted due to the overlapping condition between the wall portion 71 and the land 65, such operation of course depending upon the spring constants of springs 55 and 69, the configurations of the cam surfaces 33a and 33b and the like.

Still referring to FIG. 1, a hydraulic pressure source, such as for example, a pump 72 is mechanically connected to the prime mover 10 and is also hydraulically connected to a reservoir 73 as well as the actuator 30, the pump 72 delivering pressurized hydraulic fluid to the second chamber 38 of the actuator 30 via a conduit 74 and the port 43. Pump 72 is also in communication with the first chamber 37 of the actuator 30 through means of the conduit 74, the first spool valve means 31, a conduit 78, and the port 42, while the chamber 37 is in turn in communication with the reservoir 73 through means of the conduit 78, the second spool valve means 32 and a conduit 79, a relief valve 80 being interposed between the conduit 74 and the reservoir 73.

A conventional governor pressure valve means 75 is associated with the input shaft 14 of the hydrostatic transmission 12 and is hydraulically connected to the conduit 74 via a conduit 76. Thus, the governor valve means 75 delivers the governor pressure, indicating a feedback or actual speed signal of the prime mover 10, to the hydraulic chambers 52 and 66 of the spool valve means 31 and 32, respectively, via means of a conduit 77.

In operation, FIG. 1 shows the condition in which the prime mover 10 is in its prearranged rotational position wherein the RPM is proportional to the throttle opening of the throttle valve 11. Both spool valve means 31 and 32 will be in the closed position so as to maintain the hydraulic pressure within the first chamber 37 of the actuator 30 whereby piston 36 is retained within the illustrated position. Assuming then that the throttle opening of the throttle valve 11 is increased, the rotational speed of the prime mover 10 is also increased, however the change of the rotational speed of the prime mover 10 in response to the change of the throttle opening of the throttle valve 11 will be delayed. This is due to the fact that the cam member 33, which is mechanically associated with the throttle valve 11, is initially rotated in the direction of the arrow when the throttle opening of the throttle valve 11 is increased, whereupon the spool valve 49 of the first spool valve means 31 is moved toward the left as the biasing force of the spring 55 urging the spool valve 49 toward the left overcomes the hydraulic pressure within the chamber 52.

The land 51 of the spool valve 49 will continue to interrupt the hydraulic communication between the ports 46 and 47, and at the same time, the biasing force of the spring 69 overcomes the hydraulic pressure within the chamber 66 so that the spool valve 63 of the second spool valve means 32 is moved so as to open the port 60. Accordingly, chamber 37 of the actuator 30 is now in communication with the reservoir 73 through means of conduit 78, port 60, chamber 67, port 61 and conduit 79, and thus the hydraulic fluid within the chamber 37 is able to be returned to the reservoir 73. The piston 36 is consequently moved toward the left in response to the hydraulic differential existing between the chambers 37 and 38, and the controllable member 18a of the hydrostatic pump-motor 18 is correspondingly rotated in the clockwise direction whereby the speed ratio of the hydrostatic transmission 12 will be reduced and the rotational speed of the prime mover 10 will be increased.

When the rotational speed of the prime mover 10 is increased due to the increase in the throttle opening of the throttle valve 11 and the reduction of the speed ratio of the hydrostatic transmission, the governor pressures within the chambers 52 and 66 overcome the spring forces of the springs 55 and 69, respectively, whereupon the spool valve 49 will be moved toward the right and the spool valve 63 will be similarly moved toward the left until the rotational speed of the prime mover 10 reaches the prearranged proportional speed in response to the particular throttle opening of the throttle valve 11. At such time, the spool valves 49 and 63 will be in the positions wherein overlapping between the land 51 of the spool valve 49 and the wall portion 57 and between the land 65 of the spool valve 63 and the wall portion 71 will occur, and consequently, the hydraulic pressure within the chamber 37 of the actuator 30 is retained so as to prevent further movement of the piston 36.

When the prime mover 10 is rotated at a speed in excess of the prearranged speed, the spool valve 49 will be moved toward the right so as to open the port 46 and the spool valve 63 will be moved toward the left so as to maintain port 60 in its closed position, and accordingly, the hydraulic pressure from the pump 72 will be transmitted to the chamber 37 of the actuator 30. Due to the difference in pressure areas between the surfaces 40 and 41 of the piston 36, the piston 36 is moved toward the right whereby the controllable member 18a of the hydrostatic transmission 18 is rotated in a counter-clockwise direction, as shown by the arrow. The speed ratio of the hydrostatic transmission 12 will thus be increased and the rotational speed of the prime mover 10 will be decreased so as to attain the prearranged speed corresponding to the particular throttle opening of the throttle valve 11. The governor pressure indicating the actual speed of the prime mover 10 will thus be lowered, and the spool valves 49 and 63 will be moved by means of the biasing forces of springs 55 and 69 toward the left and right, respectively. The foregoing operation will of course be repeated periodically so that the prime mover 10 will continuously operate under optimum motive fluid consumption conditions.

It should also be apparent that when the throttle opening of the throttle valve 11 is decreased, the cam member 33 is initially rotated in the counter-clockwise direction whereupon the governor pressure indicative of the actual speed of the prime mover 10 will overcome the biasing forces of the springs 55 and 69 in response to the signal indicating the motive fluid required of the prime mover 10. The chamber 37 of the actuator 30 now receives the pressurized fluid from the pump 72 and the piston 36 is caused to move toward the right whereby the speed ratio of the hydrostatic transmission 12 will be increased and the rotational speed of the prime mover 10 will be decreased.

Figure 2:
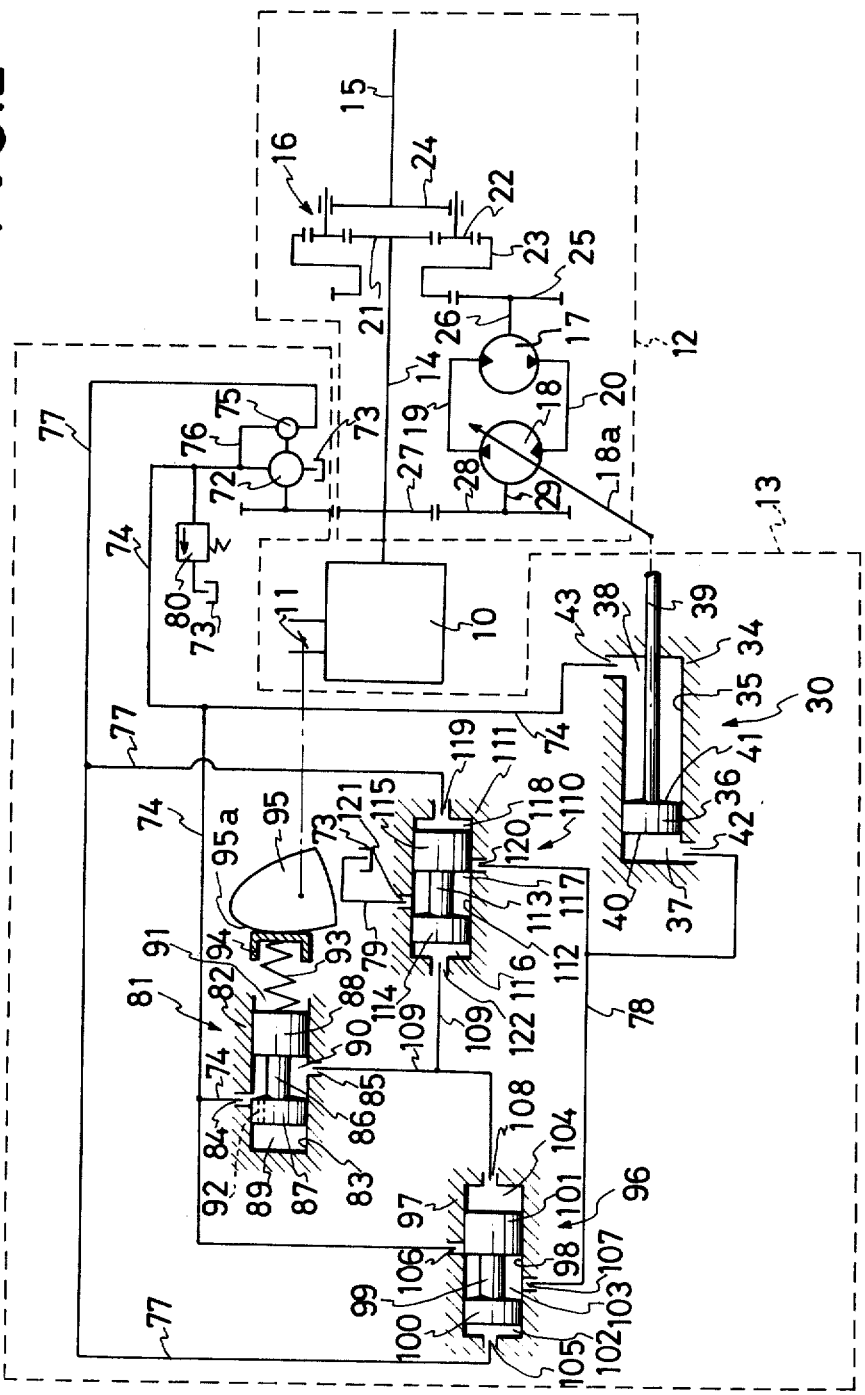
FIG. 2 is a view similar to that of FIG. 1, showing however a further embodiment of the present invention.

Referring now to FIG. 2, a modified embodiment of the present invention includes a hydraulic modulator valve, generally indicated by the reference character 81, which comprises a housing 82 having a cylindrical bore 83 provided therein, a spool valve 86 having lands 87 and 88 being slidably disposed within the cylinder 83 so as to thereby define three chambers 89, 90 and 91. The housing 82 is also provided with axially spaced inlet and outlet ports 84 and 85, inlet port 84 receiving hydraulic pressurized fluid from the pump 72 via the conduit 74. An orifice 92 is provided within the land 87 of the spool valve 86 so as to establish hydraulic communication between the chambers 89 and 90, and the spool valve 86 may thus be urged toward the right by means of the hydraulic pressure within the chamber 89.

A compression coil spring 93, which engages the spool valve 86 at one end thereof, also engages a cam surface 95a of a cam member 95 through means of a shoe 94 at the other end thereof, cam 95 being in turn connected to throttle valve 11, and thus, the spool valve 86 is urged toward the left by means of the biasing force of the spring 93 in proportion to the throttle opening of the throttle valve 11. The land 87 of the spool valve 86 thereby displaced controls the hydraulic communication between the port 84 and the chamber 90 as such may overlap a portion of the wall of the housing 82 and thereby terminate such communication and thus the modulator valve 81 delivers modulated hydraulic pressure, proportional to the throttle opening of the throttle valve 11, to the first and second spool valve means, generally indicated by reference characters 96 and 110, via a conduit 109.

The first spool valve means 96 comprises a housing 97 which is provided with a cylindrical bore 98, a spool valve 99 having two lands 100 and 101 being slidably disposed within the cylinder 98 so as to define three hydraulic chambers 102, 103 and 104 therewithin, ports 105, 106, 107 and 108 also being provided within the housing 97. As modulated hydraulic pressure is transmitted to chamber 104 from the modulator valve 81 via the conduit 109 and the port 108, the spool valve 99 is urged in a direction whereby hydraulic communication between the pump 72 and the chamber 37 of the actuator 30 is interrupted, while governor pressure within the chamber 102 urges spool valve 99 in a direction whereby the pump 72 is hydraulically connected to the chamber 37 of the actuator 30 through means of conduit 74, port 106, chamber 103, port 107 and conduit 78.

The second spool valve means 110 similarly includes a housing 111 which is provided with a cylindrical bore 112 in which a spool valve 113 having two lands 114 and 115 is slidably disposed so as to define a chamber 116 which is connected to the conduit 109 through means of a port 122, a chamber 117 which is connected to the conduit 79 through means of a port 121, and a chamber 118 which is connected to the conduit 77 through means of a port 119, another port 120 being connected to the conduit 78. Hydraulic communication between the chamber 117 and the port 120 will be controlled by the land 115 of the spool valve 113, and thus, the spool valve 113 is urged in an open direction by means of the modulated pressure responsive to the throttle opening of the throttle valve 11, and is urged in a closed direction by means of the governor pressure. The second embodiment of the present invention operates in substantially the same manner as previously described with respect to the first embodiment of the present invention.

Figure 3:
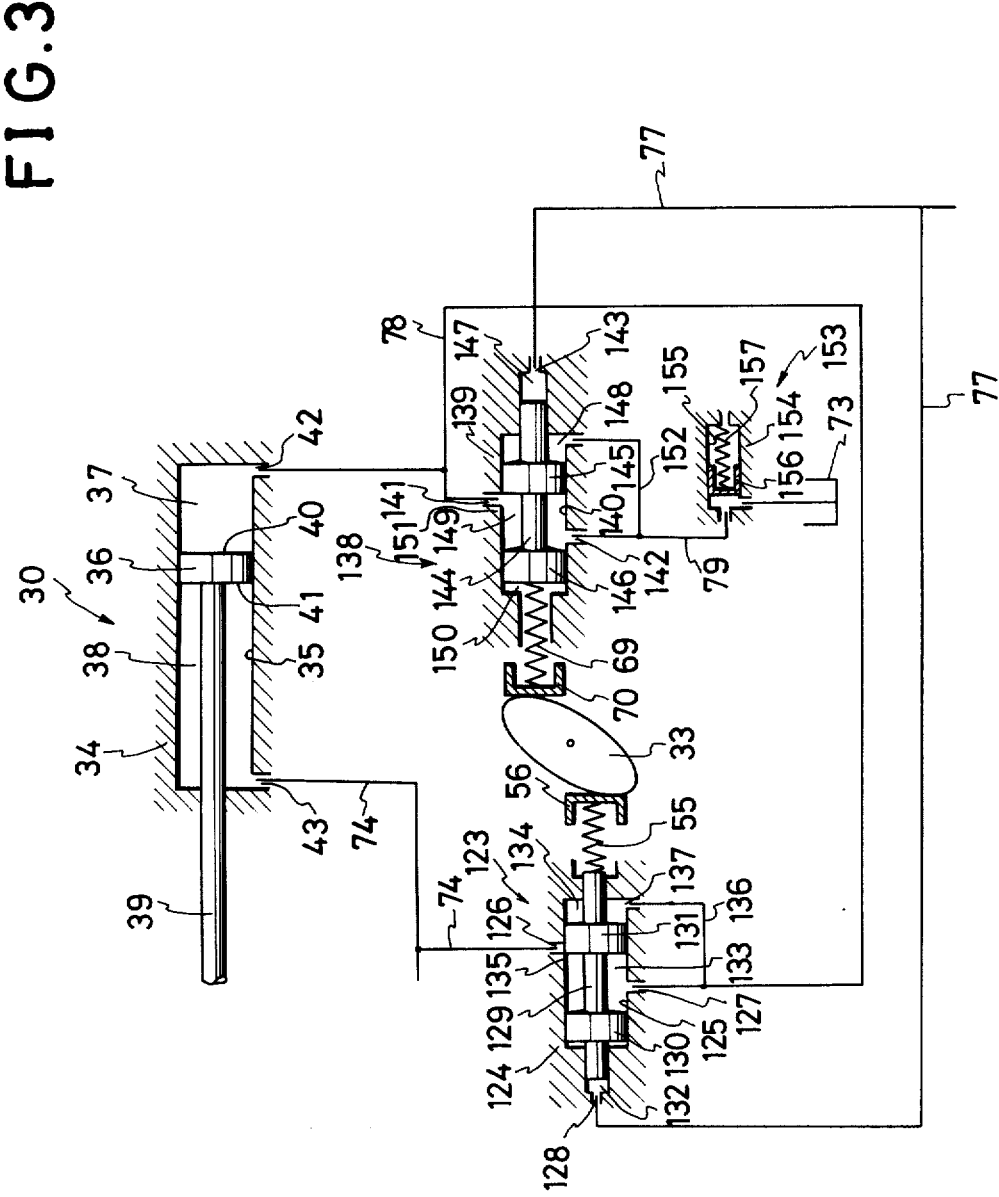
FIG. 3 is a partial view, similar to that of FIG. 1, showing however a still further embodiment of the present invention.

Referring now to FIG. 3, a third embodiment of the present invention is illustrated as including a first spool valve means, generally indicated by the reference character 123 which comprises a spool valve 129 slidably disposed within a cylindrical bore 125 of a housing 124. The spool valve 129 has two lands 130 and 131 so as to thereby define three hydraulic chambers 132, 133 and 134 within housing 124, chamber 132 receiving the governor pressure through means of a port 128 and conduit 77, while the chamber 133 is always connected to the conduit 78 through means of a port 127. The pressurized fluid from the pump is transmitted to the chamber 133 through means of a port 126 depending upon the relative position between the land 131 of the spool valve 129 and the wall portion 135 of the housing 124, and the chamber 134 is hydraulically connected to the conduit 78 via a conduit 136.

A second spool valve means, generally indicated by the reference character 138 comprises a housing 139 which is provided with a cylindrical bore 140 and three ports 141, 142 and 143, a spool valve 144 having two lands 145 and 146 being slidably disposed therein and defining four chambers 147, 148, 149 and 150 within the housing 139 as shown in FIG. 3. Hydraulic communication between the port 141 and the chamber 149 is dependent upon the relative position between the land 145 of the spool valve 144 and a wall portion 151 of the housing 139, and the chamber 148 is hydraulically connected to the conduit 79 via a conduit 152 and another port, not numbered, within housing 139. Disposed within the conduit 79 is a relief valve, generally indicated by the reference character 153, which includes a valve member 156 slidably disposed within a bore 155 of a housing 154 and biased by means of a spring 157.

The first and second spool valve means 123 and 138 are operated in substantially the same manner as previously described in the first embodiment of the present invention. As seen in FIG. 3, however, when both spool valves 129 and 144 are moved to their open positions, respectively, the chambers 134 and 148 of the spool valve means 123 and 138 receive hydraulic feedback pressures, respectively, which urge the spool valves 129 and 144 into their closed positions, respectively, so that the overshoot movements of the spool valves 129 and 144 will be prevented, such of course resulting in the movement of piston 36 to the optimum condition within a relatively short period of time.

Obviously, many modifications and variations of the present invention are possible in light of the above teachings. It is to be understood therefore, that within the scope of the appended claims, the present invention may be practiced otherwise than as specifically described herein.

What is claimed as new and desired to secured by Letters Patent of the United States is:

1. In a power system comprising a prime mover (10), including a controllable transmission member (18a), and a means (11) for generating a first signal indicative of the power required of said prime mover, a servo mechanism (13) comprising:
   a source of pressurized fluid (72);
   a reservoir (73);
   an actuator (30) including a housing having a bore (35) therein and a piston (36) slidably disposed within said bore so as to thereby define first (37) and second (38) hydraulic chambers within said housing, said piston having large and small hydraulic pressure receiving areas (40, 41) which are exposed to said first and second chambers, respectively, and being connected to said controllable transmission member;
   means (75) for generating a second signal indicative of the actual speed of said prime mover;
   a first passage means (74, 43) for connecting said source of pressurized fluid to said second chamber of said actuator;
   a second passage means (74, 53, 78, 42) for connecting said source of pressurized fluid to said first chamber of said actuator;
   a first spool valve means (31) disposed within said second passage means for controlling the hydraulic communication therethrough;
   means for transmitting said first and second signals to said first spool valve means, whereby a differential signal thereto is provided, said first spool valve means being responsive to said differential signal between said first signal and said second signal;
   said first spool valve means (31) having a housing (44), a spool valve (49) slidably fitted within said housing and responsive to said differential signal between said first signal and said second signal, and first and second ports (46, 47) provided in said housing, said first port being hydraulically connected with said source of pressurized fluid while said second port is hydraulically connected with said first chamber of said actuator, said spool valve being movable to control the flow of pressurized fluid from said first port to said second port;

a third passage means (79, 61, 60, 42) for connecting said first chamber of said actuator to said reservoir;

a second spool valve means (32) disposed within said third passage means and having a housing (58), a spool valve (63) slidably fitted within said housing being responsive to said differential signal for controlling the hydraulic communication between said first chamber of said actuator and said reservoir, and first and second ports (61, 60) provided in said housing (58), said first port being hydraulically connected with said reservoir while said second port is hydraulically connected with said first hydraulic chamber of said actuator, said spool valve being movable to control the flow of pressurized fluid from said second port (60) to said first port (61);

means for transmitting said differential signal to said second spool valve means; and means (33) connected to said first signal generating means (11) and disposed between said first and second spool valve means (31, 32) for moving said spool valves (49, 63) of said first and second spool valve means simultaneously and in opposite directions in response to movement of said first signal generating means, whereby when one of said source of pressurized fluid and said reservoir is hydraulically connected with said first chamber of said actuator, the other of said source of pressurized fluid and said reservoir is interrupted from hydraulic connection therewith.

2. A servo mechanism as set forth in claim 1, wherein said means for simultaneously moving said spool valves of said first and second spool valve means comprises:

cam means (33) mechanically connected to said first signal generating means and adapted to urge said first and second spool valves against said second signal.

3. A servo mechanism as set forth in claim 1, further comprising:

fourth passage means 136 for transmitting hydraulic fluid pressure within said second passage means which is interposed between said first spool valve means and said actuator to said first spool valve means whereby said first spool valve means is biased toward its closed position;

a relief valve 157 disposed within said third passage means between said second spool valve means and said reservoir; and a fifth passage means 152 for transmitting the hydraulic fluid pressure within said third passage means between said second spool valve means and said relief valve to said second spool valve means whereby said second spool valve means is biased toward its closed position.

4. A servo mechanism as set forth in claim 1, further comprising:

a fourth passage means (74, 84) for connecting said source to said first and second valve means; and a hydraulic modulator valve (81) disposed within said fourth passage means to deliver modulated hydraulic pressure in response to said first signal to said first and second spool valve means.

5. A servo mechanism as set forth in claim 4, further comprising:

cam means (95) for actuating said modulator valve in response to said first signal.

6. In a power system including a prime mover (10) powered by a motive fluid, throttle means (11) for controlling the motive fluid, and a hydrostatic transmission (12), a servo mechanism comprising:

a source of pressurized fluid (72);

a reservoir (73);

an actuator (30) including a housing (34) having a bore (35) therein and a piston (36) slidably disposed within said bore so as to define first (37) and second (38) hydraulic chambers within said housing, said piston having large and small hydraulic pressure receiving areas (40, 41) which are exposed to said first and second chambers, respectively, and being connected to said hydrostatic transmission so as to continuously adjust the variable drive ratio of said hydrostatic transmission;

means (75) to generate a signal indicative of the actual speed of said prime mover;

a first passage means (74, 43) for connecting said source of pressurized fluid to said second chamber of said actuator;

a second passage means (74, 103, 78, 42) for connecting said source of pressurized fluid to said first chamber of said actuator;

a first spool valve means (99) disposed within said second passage means and responsive to a signal indicative of the throttle opening of said throttle means so as to be biased in a direction in which hydraulic flow within said second passage means is interrupted and further being responsive to said actual prime mover speed signal so as to be biased in another direction by which flow within said second passage means is permitted;

a third passage means (79,121,120,42) for connecting said first chamber of said actuator to said reservoir; and a second spool valve means (110) disposed within said third passage means, said second spool valve means being responsive to said signal indicative of said throttle opening of said throttle means so as to be urged in one direction by which flow within said third passage means is permitted and being responsive to said actual prime mover speed signal so as to be biased in another direction by which flow within said third passage means is interrupted.

7. A servo mechanism as set forth in claim 6, wherein said signal indicative of said throttle opening of said throttle valve is a mechanical signal.

8. A servo mechanism as set forth in claim 6, wherein said signal indicative of said throttle opening of said throttle valve is a mechanical signal, and further comprising means (95,81) for converting said mechanical signal into a hydraulic signal.

* * * * *